United States Patent
Badding et al.

(10) Patent No.: US 12,368,164 B2
(45) Date of Patent: Jul. 22, 2025

(54) MODIFIED CATHODES FOR SOLID-STATE LITHIUM SULFUR BATTERIES AND METHODS OF MANUFACTURING THEREOF

(71) Applicants: Corning Incorporated, Corning, NY (US); Shanghai Institute of Ceramics, Chinese Academy of Sciences, Shanghai (CN)

(72) Inventors: Michael Edward Badding, Campbell, NY (US); Jun Jin, Shanghai (CN); Zhen Song, Painted Post, NY (US); Jianing Wang, Shanghai (CN); Zhaoyin Wen, Shanghai (CN); Tongping Xiu, Shanghai (CN)

(73) Assignees: Corning Incorporated, Corning, NY (US); Shanghai Institute of Ceramics, Shanghai (CN)

( * ) Notice: Subject to any disclaimer, the term of this patent is extended or adjusted under 35 U.S.C. 154(b) by 809 days.

(21) Appl. No.: 17/603,380

(22) PCT Filed: Apr. 14, 2020

(86) PCT No.: PCT/US2020/028083
§ 371 (c)(1),
(2) Date: Oct. 13, 2021

(87) PCT Pub. No.: WO2020/214570
PCT Pub. Date: Oct. 22, 2020

(65) Prior Publication Data
US 2022/0181628 A1    Jun. 9, 2022

(30) Foreign Application Priority Data
Apr. 18, 2019 (CN) .......................... 201910314215.3

(51) Int. Cl.
*H01M 4/62* (2006.01)
*H01M 4/02* (2006.01)
(Continued)

(52) U.S. Cl.
CPC ......... *H01M 4/62* (2013.01); *H01M 10/0525* (2013.01); *H01M 10/0562* (2013.01);
(Continued)

(58) Field of Classification Search
CPC . H01M 10/0525; H01M 10/0562; H01M 4/62
See application file for complete search history.

(56) References Cited

U.S. PATENT DOCUMENTS

| | | | | |
|---|---|---|---|---|
| 2019/0123377 A1* | 4/2019 | Yang | ........................ | H01M 4/13 |
| 2020/0075960 A1* | 3/2020 | Wachsman | .............. | H01M 4/38 |

FOREIGN PATENT DOCUMENTS

| | | | | |
|---|---|---|---|---|
| CN | 106920941 A | * | 7/2017 | .......... H01M 10/052 |
| CN | 107681091 A | | 2/2018 | |

(Continued)

OTHER PUBLICATIONS

International Search Report and Written Opinion of the International Searching Authority; PCT/US2020/028083; dated Sep. 29, 2020; 17 pages; European Patent Office.

(Continued)

*Primary Examiner* — Karie O'Neill Apicella

(57) ABSTRACT

A lithium-sulfur battery includes a substrate; a sulfur cathode disposed on the substrate; a coating layer disposed on the cathode; a first interlayer disposed on the coating layer; a solid-state electrolyte disposed on the first interlayer; a second interlayer disposed on the electrolyte; and a lithium anode disposed on the second interlayer, such that the coating layer is further disposed within pores of the cathode.

17 Claims, 8 Drawing Sheets

(51) Int. Cl.
*H01M 10/0525* (2010.01)
*H01M 10/0562* (2010.01)
(52) U.S. Cl.
CPC ........... *H01M 2004/021* (2013.01); *H01M 2004/027* (2013.01); *H01M 2004/028* (2013.01); *H01M 2300/0068* (2013.01)

(56) References Cited

FOREIGN PATENT DOCUMENTS

| EP | 3016181 A1 | 5/2016 |
| EP | 3206248 A1 | 8/2017 |
| KR | 10-2018-0091847 A | 8/2018 |
| WO | 2017/116599 A2 | 7/2017 |
| WO | 2020/005702 A1 | 1/2020 |

OTHER PUBLICATIONS

Korean Patent Application No. 10-2021-7036947 , Office Action dated Feb. 17, 2025, 8 pages (English Translation only), Korean Patent Office.

\* cited by examiner

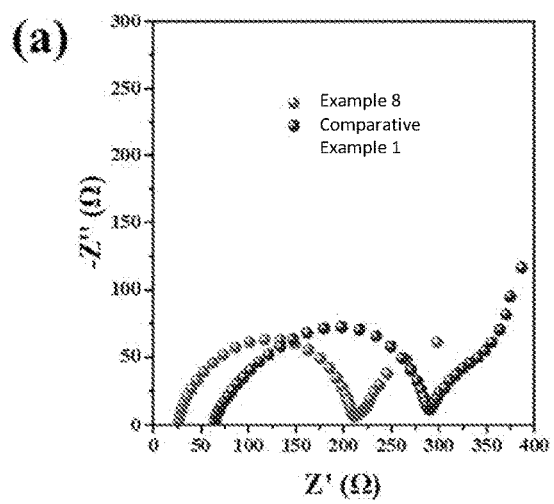
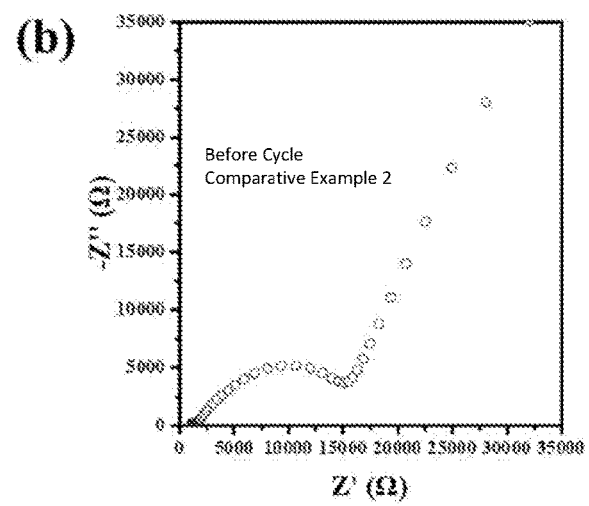
FIG. 8A
FIG. 8B
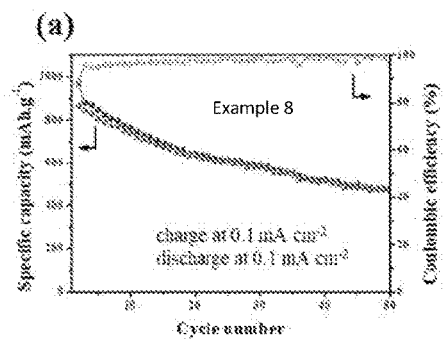
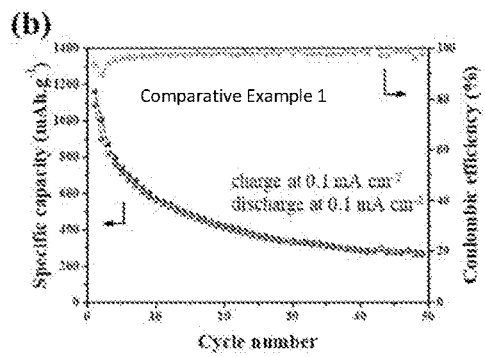
FIG. 9A
FIG. 9B

MODIFIED CATHODES FOR SOLID-STATE LITHIUM SULFUR BATTERIES AND METHODS OF MANUFACTURING THEREOF

BACKGROUND

Cross-Reference to Related Applications

This application claims the benefit of priority under 35 U.S.C. § 371 of International Application No. PCT/US2020/028083, filed on Apr. 14, 2020, which claims the benefit of priority under 35 U.S.C. § 119 of Chinese Patent Application Serial No. 201910314215.3, filed on Apr. 18, 2019, the contents of each of which are relied upon and incorporated herein by reference in their entirety.

1. Field

This disclosure relates to cathodes for solid-state lithium sulfur (Li—S) batteries and methods of manufacturing thereof.

2. Technical Background

Lithium-sulfur (Li—S) batteries are promising candidates for replacing conventional lithium-ion batteries since they are high energy and low cost. For example, Li—S cell chemistries have a high energy density (e.g., 2600 W·h·kg$^{-1}$) and theoretical specific capacity (e.g., 1675 mA·h·g$^{-1}$), natural abundance and is environmentally friendly.

One challenge for conventional Li—S technologies is the electronically and ionically insulating nature of elemental sulfur (used as a component in the cathode), which requires a large fraction of conducting additives in the cathode and as a result, significantly reduces practical energy density and applicability. Another drawback is the soluble nature of the long-chain polysulfides produced during battery discharging in conventional organic electrolytes. As a result of polysulfide migration from the cathode to the lithium (Li) anode, unwanted side reactions are induced, with the polysulfide shuttling resulting in a lowered Coulombic efficiency and a continuous loss of the active cathode material.

The present application discloses improved cathodes and methods of formation thereof for solid-state lithium sulfur (Li—S) battery applications.

SUMMARY

In some embodiments, a lithium-sulfur battery, comprises: a substrate; a sulfur cathode disposed on the substrate; a coating layer disposed on the cathode; a first interlayer disposed on the coating layer; a solid-state electrolyte disposed on the first interlayer; a second interlayer disposed on the electrolyte; and a lithium anode disposed on the second interlayer, wherein the coating layer is homogenously disposed within pores of the cathode and directly contacts the substrate.

In one aspect, which is combinable with any of the other aspects or embodiments, the coating layer comprises at least one of: carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof.

In one aspect, which is combinable with any of the other aspects or embodiments, the coating layer comprises at least one lithium salt selected from the group consisting of: bis(trifluoromethane) sulfonimide lithium salt (LiN(CF$_3$SO$_2$)$_2$)(LiTFSI), lithium perchlorate, lithium bis(oxalato) borate (LiBOB), lithium bis(fluorosulfonyl)imide (LiFSI), lithium trifluoromethanesulfonate (LiCF$_3$SO$_3$) (LiTf), lithium bis(trifluoromethanesulfonimide) (Li(C$_2$F$_5$SO$_2$)$_2$N) (LiBETI), or combinations thereof.

In one aspect, which is combinable with any of the other aspects or embodiments, the coating layer comprises at least one of elemental nitrogen, carbon, cobalt, titanium, tantalum, and tungsten.

In one aspect, which is combinable with any of the other aspects or embodiments, the coating layer comprises a N—C—Co composite.

In one aspect, which is combinable with any of the other aspects or embodiments, the coating layer comprises polyethylene oxide, at least one of LiTFSI, LiTf, and LiBETI, and a N—C—Co composite.

In one aspect, which is combinable with any of the other aspects or embodiments, the N—C—Co composite comprises a rhombic dodecahedral morphology and at least one dimension in a range of 10 nm to 50 nm.

In one aspect, which is combinable with any of the other aspects or embodiments, the N—C—Co composite comprises a mesoporous structure and a BET surface area in a range of 100 m$^2$/g to 300 m$^2$/g.

In one aspect, which is combinable with any of the other aspects or embodiments, the sulfur cathode and the coating layer have a combined thickness of less than 200 μm.

In one aspect, which is combinable with any of the other aspects or embodiments, the solid-state electrolyte comprises at least one of: Li$_{6.4}$La$_3$Zr$_{1.4}$Ta$_{0.6}$O$_{12}$ (LLZTO), Li$_{10}$GeP$_2$S$_{12}$, Li$_{1.5}$Al$_{0.5}$Ge$_{1.5}$(PO$_4$)$_3$, Li$_{1.4}$Al$_{0.4}$Ti$_{1.6}$(PO$_4$)$_3$, Li$_{0.55}$La$_{0.35}$TiO$_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed Li$_3$PS$_4$, or combinations thereof.

In one aspect, which is combinable with any of the other aspects or embodiments, the cathode has a porosity of at least 30%.

In one aspect, which is combinable with any of the other aspects or embodiments, the cathode has a porosity of at least 60%.

In one aspect, which is combinable with any of the other aspects or embodiments, the pores of the cathode have a size in a range of 1 μm to 50 μm.

In one aspect, which is combinable with any of the other aspects or embodiments, the battery is configured to exhibit at least one of: an impedance below 250 Ω·cm$^2$; a reversible capacity of at least 500 mA/hgs$^1$; or a capacity retention of at least 40%.

In some embodiments, a lithium-sulfur battery, comprises: a sulfur cathode disposed on a substrate; a coating layer disposed on the cathode; wherein the coating layer is a polyethylene oxide (PEO)-based lithium ion conductive layer with N—C—Co composite, further disposed within pores of the cathode.

In one aspect, which is combinable with any of the other aspects or embodiments, the coating layer comprises at least one lithium salt selected from the group consisting of: bis(trifluoromethane) sulfonimide lithium salt (LiN($CF_3SO_2$)$_2$)(LiTFSI), lithium perchlorate, lithium bis(oxalato) borate (LiBOB), lithium bis(fluorosulfonyl)imide (LiFSI), lithium trifluoromethanesulfonate (LiCF$_3$SO$_3$) (LiTf), lithium bis(trifluoromethanesulfonimide) (Li($C_2F_5SO_2$)$_2$N) (LiBETI), or combinations thereof.

In one aspect, which is combinable with any of the other aspects or embodiments, the N—C—Co composite comprises a rhombic dodecahedral morphology and at least one dimension in a range of 10 nm to 50 nm.

In one aspect, which is combinable with any of the other aspects or embodiments, the N—C—Co composite comprises a mesoporous structure and a BET surface area in a range of 100 m$^2$/g to 300 m$^2$/g.

In one aspect, which is combinable with any of the other aspects or embodiments, the sulfur cathode and the coating layer have a combined thickness of less than 200 μm.

In one aspect, which is combinable with any of the other aspects or embodiments, the battery is configured to exhibit at least one of: an impedance below 250 Ω·cm$^2$; a reversible capacity of at least 500 mA/hgs$^1$; or a capacity retention of at least 40%.

BRIEF DESCRIPTION OF THE DRAWINGS

The disclosure will become more fully understood from the following detailed description, taken in conjunction with the accompanying figures, in which:

FIGS. 8A and 8B illustrate impedance plots of Li—S batteries before cycling with Example 8 and Comparative Example 1 (FIG. 8A) and Comparative Example 2 (FIG. 8B).

FIGS. 9A and 9B illustrate cycling performance of Li—S battery with Example 8 (FIG. 9A) and Comparative Example 1 (FIG. 9B).

DETAILED DESCRIPTION

Figure 1:
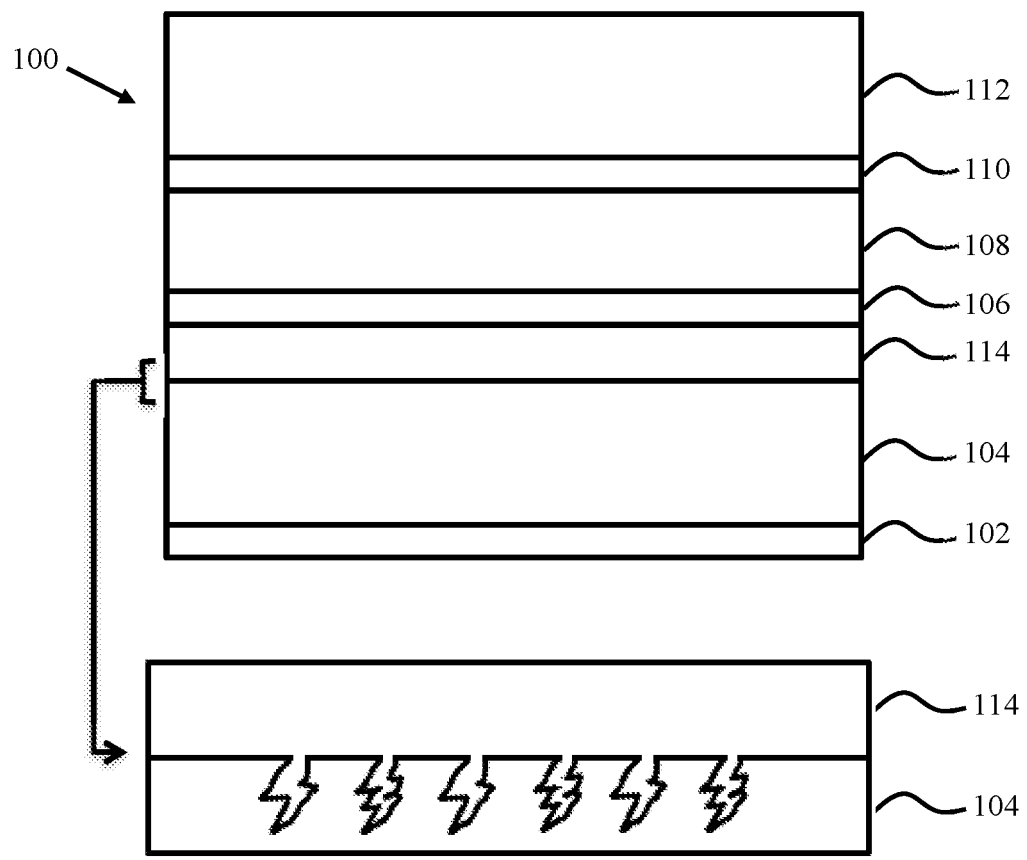
FIG. 1 illustrates a structure of a solid-state lithium sulfur (Li—S) battery, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

The present disclosure relates to solid-state lithium-sulfur batteries, and more particularly, to the carbon-sulfur (C—S) cathodes with modified interfaces in which a polyethylene oxide (PEO)-based lithium ion conductive layer with N—C—Co composite is coated on a surface of the C—S cathode facing the solid-state electrolyte. A designed solid-state lithium-sulfur battery structure with the modified cathode is also disclosed.

FIG. 1 illustrates an example of a solid-state lithium sulfur (Li—S) battery structure, according to some embodiments. It will be understood by those of skill in the art that the processes described herein can be applied to other configurations of solid-state lithium sulfur (Li—S) battery structures.

In some embodiments, battery 100 may include a substrate 102 (e.g., a current collector), a sulfur electrode (e.g., cathode) 104 disposed on the substrate, a coating layer 114 disposed on the cathode, a first interlayer 106 disposed on the coating layer, a solid-state electrolyte 108 disposed on the first interlayer, a second interlayer 110 disposed on the electrolyte, and a lithium electrode (e.g., anode) 112 disposed on the second interlayer. These can be disposed horizontally in relation to each other or vertically.

In some examples, the substrate 102 may a current collector including at least one of three-dimensional nickel (Ni) foam, carbon fiber, foils (e.g., aluminum, stainless steel, copper, platinum, nickel, etc.), or a combination thereof. In some examples, the interlayer 106 and 110 may be independently chosen from at least one of carbon-based interlayers (e.g., interlinked freestanding, micro/mesopore containing, functionalized, biomass derived), polymer-based interlayers (e.g., PEO, polypyrrole (PPY), polyvinylidene fluoride, etc.), metal-based (e.g., Ni foam, etc.), or a combination thereof. In some examples, at least one of interlayers 106 or 110 are PEO$_{18}$LiTFSI-10% SiO$_2$-10% IL. In other words, the interlayer contains polyethylene oxide (PEO), bis(trifluoromethane) sulfonimide lithium salt (LiN($CF_3SO_2$)$_2$, or LiTFSI), SiO$_2$ nanoparticles and ionic liquid (IL). Addition of SiO$_2$ and IL in the interlayer reduces the crystallinity of PEO and increases ionic conductivity.

In some examples, solid-state electrolyte 108 may be used to address common safety concerns such as leakage, poor chemical stability, and flammability often seen in Li—S batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

In some examples, the anode 112 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof.

Description of the sulfur cathode 104, coating layer 114, and methods of formation are described below.

Figure 2:
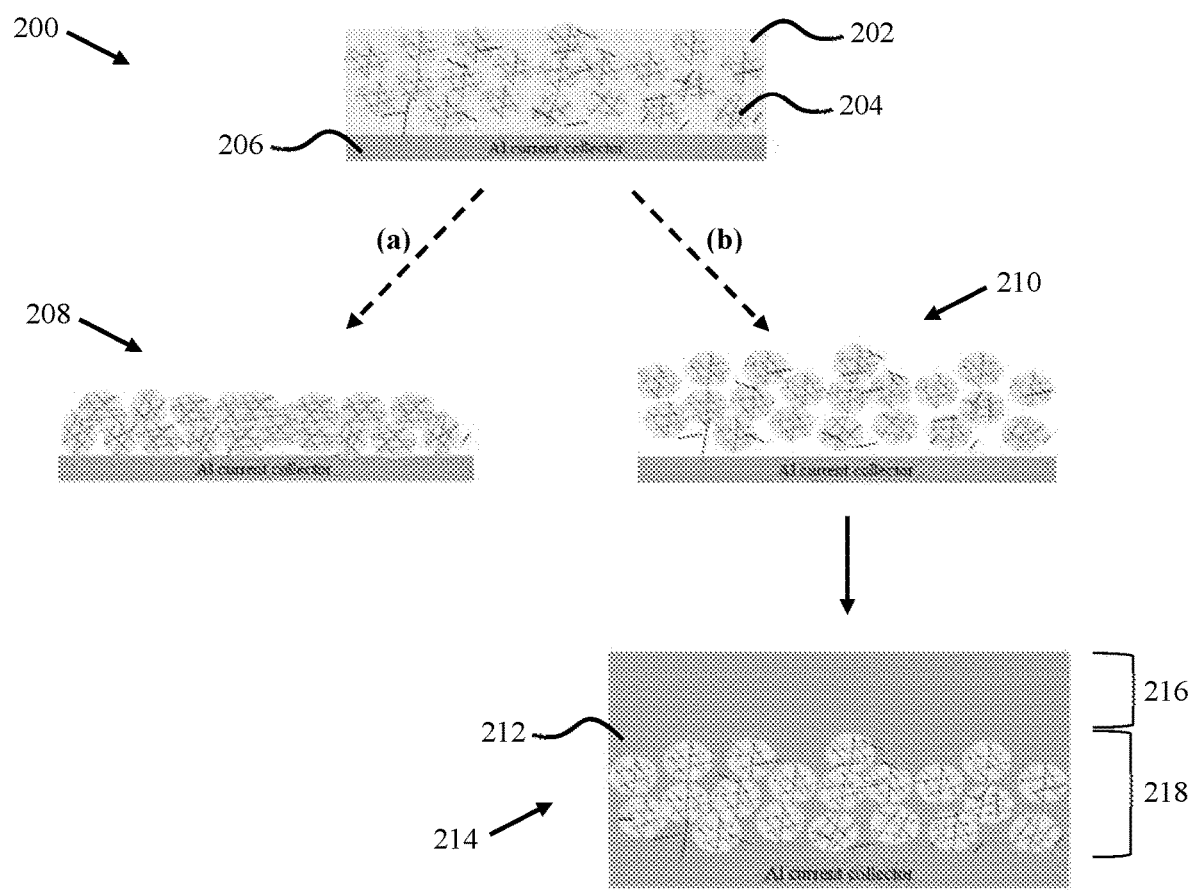
FIG. 2 illustrates a scheme of Li—S sulfur cathode dried by (a) heat drying; and (b) freeze drying, according to some embodiments.

FIG. 2 illustrates a scheme 200 of Li—S sulfur cathode dried by (a) heat drying; and (b) freeze drying. In a first step of the cathode formation scheme, a current collector substrate 206 is coated with a sulfur-based slurry layer comprising binder 202 and sulfur composite 204. The slurry layer may be formed as follows. Initially, a metal carbide, carbon material, and sulfur material is mixed in a solvent to form a sulfur precursor. The metal carbide may be a carbide comprising at least one of tungsten (W), iron (Fe), chromium (Cr), manganese (Mn), cobalt (Co), nickel (Ni), titanium (Ti), zirconium (Zr), hafnium (Hf), vanadium (V), niobium (Nb), tantalum (Ta), molybdenum (Mo), sodium (Na), calcium (Ca), or a combination thereof. The carbon material may be at least one of nanoparticles, nanowires, nanofibers, nanorods, nanotubes, nanospheres, graphene, carbon black (e.g., Ketjen black) or combinations thereof. The sulfur material is elemental sulfur. The solvent may be any known compatible solvent such as at least one of water, hexane, octane, acetone, tetrahydrofuran, 2-butanone, toluene, xylene, ethanol, methanol, isopropanol, benzene, or combinations thereof. In some examples the mixing may be conducted by at least one of ball milling, sonication, magnetic mixing, vortex mixing, etc.

Thereafter, the sulfur precursor may be milled (e.g., dry milling, etc.) to form a sulfur composite, which is then mixed and agitated with a binder to form the sulfur-based slurry. In some examples, the binder includes at least one of styrene-butadiene rubber, carboxyl methyl cellulose, polyacrylic acid (PAA), sodium alginate, or combinations thereof. In some examples, the binder includes styrene-butadiene rubber and carboxyl methyl cellulose. In some examples, the binder includes water. The slurry having the sulfur composite 204 and binder 202 is then positioned onto the substrate 206 by at least one of spin coating, dip coating, layer-by-layer deposition, sol-gel deposition, inkjet printing, or combinations thereof.

Thereafter, the sulfur-based slurry layer may be heat dried, as in route (a), or freeze-dried, as in route (b) of FIG. 2, depending on desired electrical properties of the battery. In some examples, route (a) may be conducted under vacuum at a temperature in a range of 50° C. to 150° C., or 50° C. to 100° C., or 50° C. to 75° C., or 100° C. to 150° C., or 125° C. to 150° C., or any value or range disclosed therein, for a time in a range of 1 hr to 24 hrs, or 2 hrs to 20 hrs, or 3 hrs to 16 hrs, or 4 hrs to 16 hrs, or 8 hrs to 16 hrs, or any value or range disclosed therein. In some examples, the packing structure 208 formed from route (a) as the solvent is removed in the heat drying process has a porosity of at least 50%, or at least 45%, or at least 40%, or at least 35%, or at least 30%, or at least 25%, or at least 20%, or any value or range disclosed therein.

In some examples, after the sulfur-based slurry layer has been disposed on the substrate, the slurry layer may be freeze-dried, as in route (b), to form a sulfur-based composite layer 210 having a porosity in a range of 50% to 99%, or 60% to 99%, or 60% to 80%, or any value or range disclosed therein. The structure of sulfur cathode may be held by freezing the solvent in the slurry layer at low temperatures before drying. Pores are formed in the composite layer as the frozen solvent sublimes during the drying (i.e., pores remain in the at the position where the solvent was originally located). In other words, during the process of freeze-drying, internal volume space of the composite layer occupied by the solvent may be retained, thereby avoiding shrinkage of the composite layer. Compared with traditional heat drying, freeze-drying may increase composite layer porosity by 3-5×.

In some examples, pores of the composite layer may have a size in a range of 1 μm to 50 μm. In some examples, the pores may have a range of 2 μm to 10 μm. In some examples, the freezing is conducted at a temperature in a range of −50° C. and 0° C., or in a range of −35° C. and −10° C., or in a range of −25° C. and −15° C. In some examples, the freezing is conducted at a temperature of −20° C. In some examples, the freezing is conducted for a time in a range of 1 hr to 12 hrs, or in a range of 2 hrs to 9 hrs, or in a range of 4 hrs to 7 hrs. In some examples, the freezing is conducted for a time of 6 hrs. In some examples, the freezing is conducted at a temperature of −20° C. for a time of 6 hrs. In some examples, the drying is conducted in a freeze drier for a time in a range of 1 hr to 24 hrs, or in a range of 6 hrs to 18 hrs, or in a range of 9 hrs to 15 hrs. In some examples, the drying is conducted for a time of 12 hrs.

In some examples, the packing structure 208 or composite layer 210 includes carbon material in a range of 5 wt. % to 40 wt. %, or in a range of 10 wt. % to 30 wt. %, or in a range of 15 wt. % to 25 wt. %. In some examples, the packing structure 208 or composite layer 210 includes metal carbide in a range of 1 wt. % to 20 wt. %, or in a range of 3 wt. % to 17 wt. %, or in a range of 5 wt. % to 15 wt. %. The carbon material and metal carbide are conductive portions uniformly dispersed in the final sulfur cathode that aide in adsorbing polysulfide (i.e., minimizing polysulfide migration) to improve sulfur utilization (i.e., minimizing loss of active cathode material).

Thereafter, a conductive layer 212 is disposed atop the composite layer 210 or packing structure 208 (not shown) and within pores of the composite layer 210 or packing structure 208 by at least one of spin coating, dip coating, layer-by-layer deposition, sol-gel deposition, inkjet printing, or combinations thereof to achieve a final structure 214 comprising sulfur cathode 218 and coating layer 216.

In some examples, the conductive layer comprises at least one of carbon polysulfides (CS), polyethylene oxides (PEO), polyaniline (PANT), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly (diallyldimethyl ammonium) bis(trifluoromethanesulfonyl) imide (TFSI) (PDDATFSI), or combinations thereof, and at least one lithium salt (e.g., bis(trifluoromethane) sulfonimide lithium salt ($LiN(CF_3SO_2)_2$)(LiTFSI), lithium perchlorate, lithium bis(oxalato) borate (LiBOB), lithium bis(fluorosulfonyl)imide (LiFSI), lithium trifluoromethanesulfonate ($LiCF_3S$ 03) (LiTf), lithium bis(trifluoromethanesulfonimide) ($Li(C_2F_5SO_2)_2N$) (LiBETI), or combinations thereof). In some examples, the conductive layer may additionally comprise at least one of, or at least two of, or at least three of nitrogen, carbon, cobalt, titanium, tantalum, and tungsten. In some examples, the conductive layer comprises a N—C—Co composite having at least one dimension in a range of 1 nm to 100 nm, or 5 nm to 50 nm, or 10 nm to 50 nm, or 10 nm to 25 nm, any value or range disclosed therein. In some examples, the conductive layer comprises a N—C—Co composite having a calculated Brunauer-Emmett-Teller (BET) surface area in a range of 50 $m^2$/g to 500 $m^2$/g, or 100 $m^2$/g to 400 $m^2$/g, or 50 $m^2$/g to 250 $m^2$/g, or 100 $m^2$/g to 300 $m^2$/g, or 300 $m^2$/g to 500 $m^2$/g, or 50 $m^2$/g to 200 $m^2$/g, or any value or range disclosed therein.

In some examples, the conductive layer comprises polyethylene oxide. In some examples, the conductive layer comprises polyethylene oxide and at least one of LiTFSI, LiTf, and LiBETI. In some examples, the conductive layer comprises polyethylene oxide, at least one of LiTFSI, LiTf, and LiBETI, and all three of nitrogen, carbon, and cobalt (e.g., N—C—Co composite). Because of the pores and pathways within the interior of the composite layer and/or packing structure, a portion of the conductive layer slurry is able to penetrate therein through its porous structure after it has been coated onto the surface of the composite layer and/or packing structure. This surface coating and internal penetration improves interfacial compatibility and enhances ionic conductivity of the resultant sulfur electrode. In some examples, the sulfur cathode 218 and coating layer 216 have a combined thickness of less than 200 nm, or less than 180 nm, or less than 160 nm, or less than 140 nm, or less than 120 nm, or less than 100 nm, or any value or range disclosed therein.

EXAMPLES

Example 1 Preparation of C—S Cathode by Route (a)

A C—S composite was prepared following a melt-diffusion strategy. Sulfur and Ketjen black (KB) was mixed with a weight ratio of 3:1. The mixture then was ground and heated in an oven at 155° C. for 12 hrs. A slurry that contains 80 wt. % S/C mixture, 10 wt. % conductive carbon (e.g., super P), 5 wt. % carboxy methyl cellulose (CMC) and 5 wt. % styrene-butadiene rubber (SBR) in deionized water was prepared by mixing and ball milling. The uniform slurry was casted onto an aluminum foil substrate followed by drying at 60° C. under vacuum for 12 hrs.

Example 2 Preparation of C—S Cathode by Route (b)

Sulfur, tungsten carbide (WC) and vapor-growth carbon fiber (VGCF) are ball-milled at a weight ratio of 6:2:2 in ethanol. After ball-milling for 4 hours, the mixed powder is filtered and dried. After an additional dry grinding (e.g., dry milling) for 24 hrs, the mixture is sieved to form a sulfur composite. A slurry is prepared by ball-milling or stirring a mixture comprising the previously-prepared sulfur composite, tungsten carbide (WC), vapor-growth carbon fiber (VGCF), styrene-butadiene rubber (SBR), and carboxyl methyl cellulose (CMC) at a weight ratio of 80:5:5:5:5. Thereafter, the slurry was coated on an aluminum foil having a thickness of 100 μm. The slurry-coated aluminum foil was then frozen at −20° C. for about 6 hrs, and then positioned in a freeze drier for approximately 12 hrs to purge the water content in the slurry. After freeze-drying, the electrode was diced into 12 mm diameter disks. The sulfur content of the cathode was measured at about 1.78 mg/$cm^2$.

Example 3 Preparation of ZIF-67 Precursor and N—C—Co Composite

In one preparation, 4 mmol of $Co(NO_3)_2·6H_2O$ and 16 mmol of 2-methylimicazole was dissolved in 50 ml of methanol to form a clear solution, separately. Then the 2-methylimidazole solution was slowly added into $Co(NO_3)_2·6H_2O$ solution while stirring. After thoroughly mixing, the solution was maintained at room temperature for 24 hrs. The resultant precipitates were collected by centrifugation, then washed with ethanol and dried at 65° C. for 12 hrs. The obtained purple ZIF-67 polyhedrons were annealed in a tube furnace under a $N_2$ flow at 600° C. for 8 hrs with a ramp rate of 1° C./min. Finally, the N—C—Co samples were obtained by treating in 2M HCl for 12 hrs to remove excess Co to form a highly porous structure with decreased mass density.

Example 4 Coating of C—S Cathode with N—C—Co/PEO Coating

A C—S cathode prepared as in Example 1 or Example 2 was used.

PEO powder and at least one lithium salt (e.g., LiTFSI, lithium perchlorate, LiBOB, LiFSI, LiTf, LiBETI, or combinations thereof) were dissolved into acetonitrile with a molar ratio of EO/$Li^+$ at about (620):1. 10-20% ionic liquid (e.g., N-Butyl, methylpyrrolidinium bis(trifluoromethylsulfonyl)imide, 1-butyl-3-methylimidazolium bis [(trifluoromethyl) sulfonyl]imide, 1-ethyl-3-methylimidazolium bis [(trifluoromethyl)sulfonyl]imide, etc.) with 5-50 wt. % the N—C—Co composite prepared according to Example 3 is added to the PEO/Li salt acetonitrile solution, and fully mixed. This solution is then soak coated onto the surface of the conventional C—S cathode followed by a vacuum drying at 60° C. (to volatize the solvent) to obtain a N—C—Co/PEO-coated cathode (i.e., see layers 104 and 114 of FIG. 1 and layers 216 and 218 of FIG. 2). The thickness of the coating layer is 20 μm to 80 μm. To ensure an adequate ion and electron conductive network in the cathode, the N—C—Co/PEO-coated cathode is designed to have a thickness of less than 200 μm.

The final sulfur cathode is then assembled with other parts (e.g., interlayer, electrolyte, Li anode) into a battery.

Example 5 Interlayer Preparation

PEO powder and lithium salt (as disclosed herein) were dissolved into acetonitrile with the molar ratio of EO/$Li^+$ at about (620):1. 10-20% ionic liquid (as in Example 4) with 10 wt. % ceramic filler (e.g., $SiO_2$, $Al_2O_3$, CuO, etc.) is added to the PEO/Li salt acetonitrile solution, and fully mixed. In some examples, the concentration of ceramic filler is in a range of 1 wt. % to 15 wt. %, determined as a function of silica particle size. The ceramic filler helps to reduce the PEO crystallinity and improve Li$^+$ conductivity. This slurry is cast into a polytetrafluoroethylene (PTFE) mold, followed by vacuum drying.

The interlayer between the cathode and electrolyte reduces interfacial impedance. In order not to significantly reduce the mass energy density and bulk energy density of the solid-state battery, the interlayer thickness is as thin as possible. In some examples, the thickness of the interlayer may be in a range of 5 µm to 50 µm or in a range of 50 µm to 150 µm.

Example 6 Garnet Solid Electrolyte Preparation

Cubic phase $Li_{6.4}La_3Zr_{1.4}Ta_{0.6}O_{12}$ (LLZTO) was synthesized from precursor powders of $LiOH·H_2O$ (AR), $La_2O_3$ (99.99%), $ZrO_2$ (AR), $Ta_2O_5$ (99.99%) with stoichiometry ratio. A 2 wt. % excess of $LiOH·H_2O$ was added to compensate for lithium loss during the sintering process. Traces of moisture and adsorbed $CO_2$ were removed from $La_2O_3$ by heat treatment at 900° C. for about 12 hrs. Raw materials were mixed via a wet grinding process in which yttrium stabilized zirconium oxide (YSZ) balls and isopropanol (IPA) were used as the milling media. The mixture was dried and calcined at 950° C. for 6 hrs in an alumina crucible, followed by a second mixing step, and calcined at 950° C. for 6 hrs again to obtain pure cubic garnet phase powder. These powders were pressed into green pellets (d~16 mm) and sintered at 1250° C. for 10 hrs, and were covered with a LLZTO powder with 10 wt. % Li excess in platinum crucibles. Well-sintered pellets were polished to a thickness of 0.8 mm.

In some examples, a thin layer of gold (Au) was ion-sputter coated on one side of the LLZTO ceramic for 10 min. The sample was then transferred into an argon filled glove box. A portion of the Li foil was melted by heating to at least 250° C. The melted lithium was then cast on a surface of the LLZTO pellet comprising the ion-sputter coated Au layer.

Example 7 Battery Assembly

Li—S batteries obtained by the processes described herein are composed of N—C—Co/PEO-coated 114 sulfur cathode 104, PEO-based interlayers 106 and 110, LLZTO ceramic solid-state electrolyte 108 and lithium metal anode 112. The solid-state lithium sulfur battery is assembled in an argon glove box. One structure of the lithium sulfur battery is shown in FIG. 1.

In some examples, the formed battery exhibits an impedance below 250 Ω·cm$^2$, or below 225 Ω·cm$^2$, or below 200 Ω·cm$^2$, or below 175 Ω·cm$^2$, or below 150 Ω·cm$^2$, or below 125 Ω·cm$^2$, or any value or range disclosed therein. In some examples, the formed battery exhibits a reversible capacity of at least 500 mA/hgs$^1$, or at least 600 mA/hgs$^1$, or at least 700 mA/hgs$^1$, or at least 800 mA/hgs$^1$, or at least 900 mA/hgs$^1$, or at least 1000 mA/hgs$^1$, or any value or range disclosed therein, at first cycle. In some examples, the formed battery exhibits a capacity retention of at least 40%, or at least 50%, or at least 60%, or at least 70%, or at least 80%, or at least 90%, or at least 95%, or at least 99%, or any value or range disclosed therein, after 50 cycles.

Example 8—C—S Cathode Formation

Sulfur and Ketjen black (KB) is ball milled with a weight ratio of 3:1 in ethanol for 4 hours. Then the powder mixture is filtered and dried at 60° C., and is further ground and heated in an oven at 155° C. for 12 hrs. The obtained S/C powder is used to make a slurry with 80 wt. % S/C composite, 10 wt. % super P, 5 wt. % CMC, and 5 wt. % SBR in deionized water. The slurry is ball milled to uniformity. The slurry is casted onto an aluminum foil substrate with a thickness of 100 µm, followed by drying at 60° C. under vacuum for 12 hrs to obtain the C—S cathode electrode. The electrode is cut into 12 mm diameter disks. The sulfur loading of the electrode is calculated to be 1.58 mg/cm$^2$.

PEO powder and LiTFSI are dissolved into acetonitrile at a mole ratio of EO/Li$^+$ of about 18:1. Thereafter, a slurry of ionic liquid with 10 wt. % N—C—Co composite is added and fully mixed in the acetonitrile solution to form a combined slurry. The solid content of the combined slurry is about 5%. Then 5 ml of the combined slurry is casted on the surface of the C—S cathode, and dried under vacuum at 60° C.

The coated C—S cathode is used in building a coin cell, with other parts formed as in Examples 5-7. The thickness of PEO electrolyte interlayer is about 100 µm.

Comparative Example 1—C—S Cathode Formation

The C—S cathode is prepared as in Example 8, excluding the presence of the N—C—Co composite in the partially infiltrated PEO layer (i.e., no N—C—Co composite).

Comparative Example 2—C—S Cathode Formation

The C—S cathode is prepared as in Example 8, excluding the presence of the partially infiltrated N—C—Co/PEO layer and the interlayers.

Characterization of Example 8, Comparative Example 1, and Comparative Example 2

Morphology Analysis

SEM images are obtained by scanning electron microscope (Hitachi JSM 6700). Element mapping images are characterized by energy dispersive spectrometer (EDS) affiliated with the HITACHI SEM.

Electrochemical Impedance Spectroscopy

Electrochemical impedance spectroscopy (EIS) is conducted with an Autolab electrochemical workstation (ECO CHEMIE B.V., Netherlands) with a Frequency Response Analyzer.

Electrochemical Performance

Charge and discharge curves for solid state lithium sulfur batteries are measured with LAND CT2001A battery test system (China) in a voltage range from 3V to 1V under a current density of 0.1 mA/cm$^2$ at 60° C. Before the battery test, cells are maintained at 70° C. for 12 hrs.

Figure 3A:
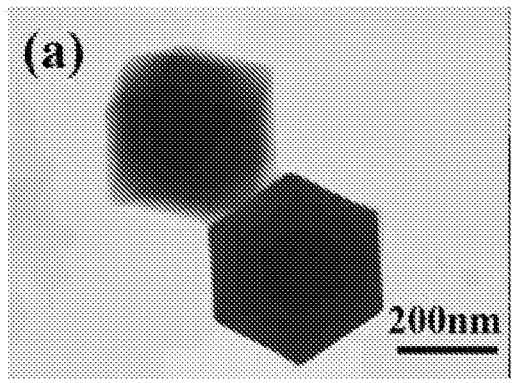
FIG. 3A illustrates a transmission electron microscopy (TEM) image of as-prepared ZIF-67.
Figure 3B:
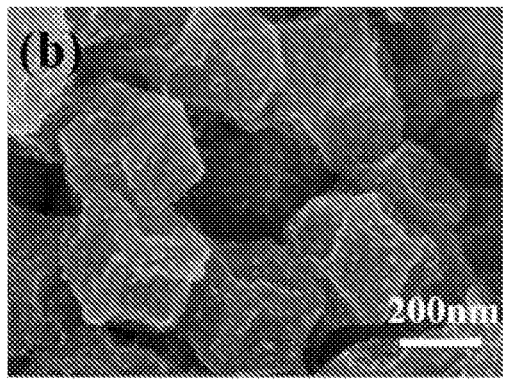
FIG. 3B illustrates a scanning electron microscopy (SEM) image of N—C—Co composite.
Figure 3C:
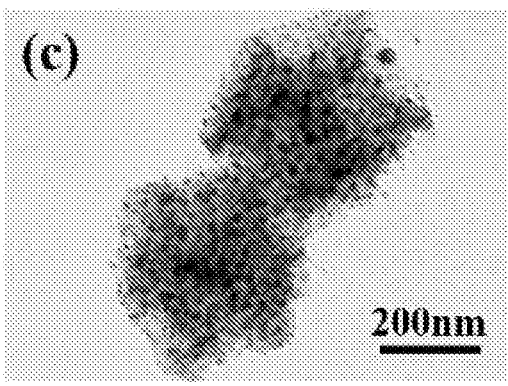
FIG. 3C illustrates a TEM image of N—C—Co composite.
Figure 3D:
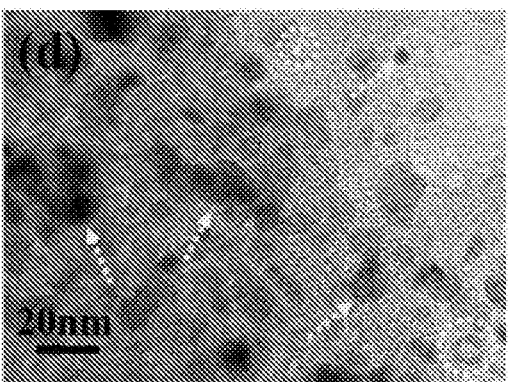
FIG. 3D illustrates a high-magnification TEM image of N—C—Co composite.
Figure 3E:
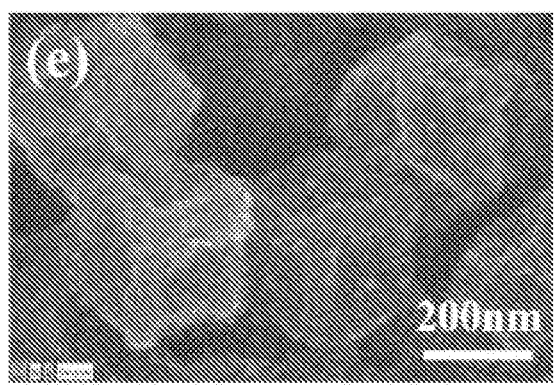
FIG. 3E illustrates a field emission SEM image of N—C—Co composite.
Figure 3F:
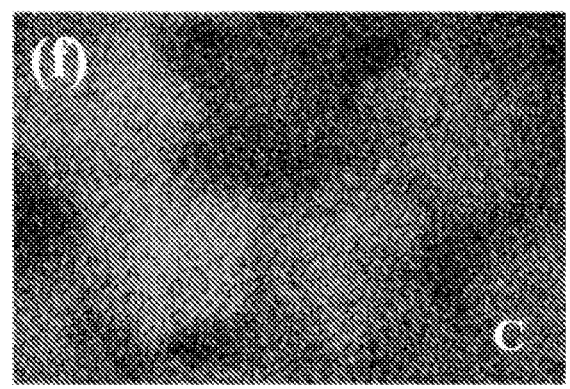
FIGS. 3F-3H illustrate elemental mapping of carbon, nitrogen, and cobalt, respectively, of N—C—Co composite, according to some embodiments.
Figure 3G:
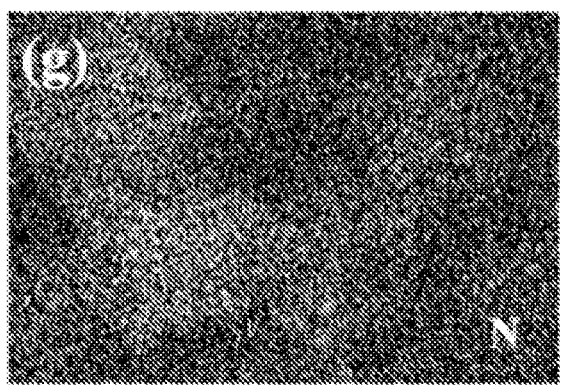

Turning now to the figures, FIG. 3A illustrates a transmission electron microscopy (TEM) image of as-prepared ZIF-67; FIG. 3B illustrates a scanning electron microscopy (SEM) image of N—C—Co composite; FIG. 3C illustrates a TEM image of N—C—Co composite; FIG. 3D illustrates a high-magnification TEM image of N—C—Co composite; FIG. 3E illustrates a field emission SEM image of N—C—Co composite; and FIGS. 3F-3H illustrate elemental mapping of carbon, nitrogen, and cobalt, respectively, of N—C—Co composite, according to some embodiments.

In other words, FIGS. 3A to 3H show SEM images, TEM images and corresponding elemental mapping of the synthesized N—C—Co composite. As a subclass of metal-organic frameworks (MOFs), the ZIF-67 framework consists of Co$^{2+}$ transition metal ions and N-containing 2-methylimidazolate ligands, which can form special frameworks resembling a zeolite topologies. As shown in FIGS. 3A and 3C, the as-synthesized ZIF-67 particles possess uniform sizes of approximately 350 nm with a rhombic dodecahedral morphology. After carbonization under $N_2$ atmosphere, the resulted N—C—Co samples inherit the unique shape of ZIF-67 (FIG. 3B) and have porous structures (FIG. 3D). The TEM images clearly reveal that cobalt nanocrystals (arrows in FIG. 3D) are homogenously inlaid in the carbon polyhedrons (dotted circle) and that the size of cobalt nanoparticles is about 20 nm (FIGS. 3C and 3D).

Figure 3H:
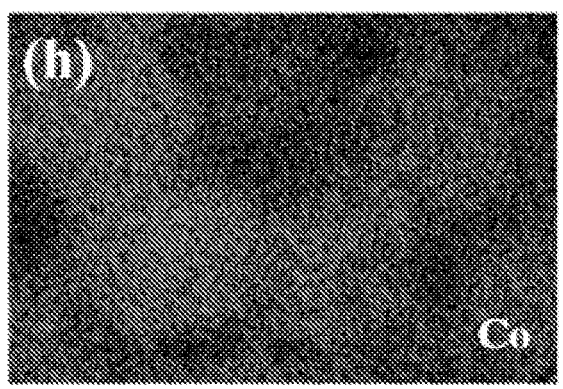

To further confirm elemental distribution of the N—C—Co composite, the SEM image and corresponding elemental mapping images of C, N, and Co for the annealed product are shown in FIGS. 3E to 3H. Organic ligands are carbonized to form a carbon framework with a homogenous incorporation of N atoms therein (FIG. 3G), and with a homogenous distribution of Co nanoparticles inside the framework (FIG. 3H).

Figure 4:
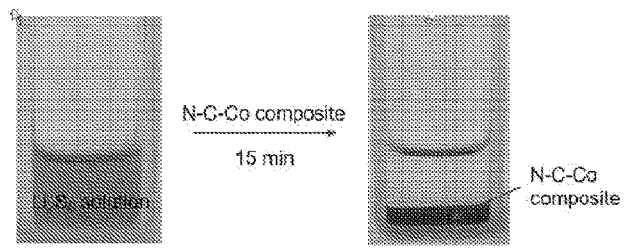
FIG. 4 illustrates the adsorption behavior of a N—C—Co composite with Li$_2$S$_6$ solution, according to some embodiments.

FIG. 4 illustrates the adsorption behavior of a N—C—Co composite with $Li_2S_6$ solution, according to some embodiments. A color change of the $Li_2S_6$ solution (left) after addition of N—C—Co composite verifies a strong adsorption of N—C—Co composite to polysulfides.

Figure 5A:
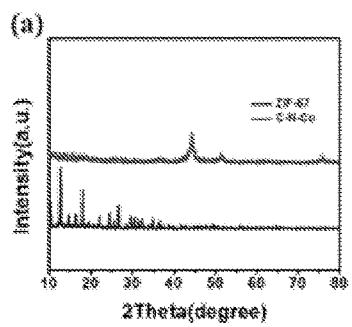
FIG. 5A illustrates x-ray diffraction (XRD) patterns of ZIF-67 and N—C—Co composite.
Figure 5B:
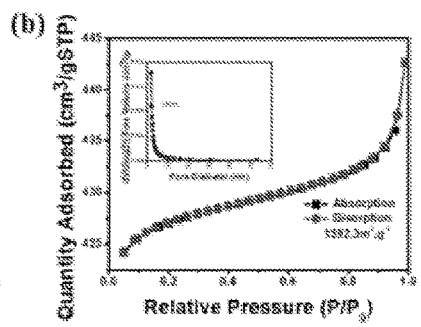
FIG. 5B illustrates N$_2$ adsorption-desorption analysis of ZIF-67.
Figure 5C:
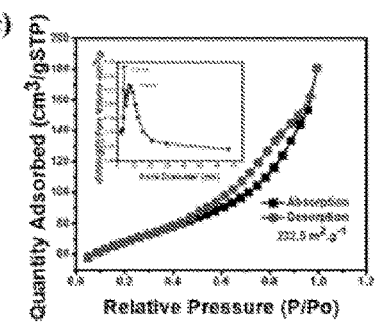
FIG. 5C illustrates N$_2$ adsorption desorption analysis of N—C—Co composite, according to some embodiments.

FIG. 5A illustrates x-ray diffraction (XRD) patterns of ZIF-67 and N—C—Co composite; FIG. 5B illustrates $N_2$ adsorption-desorption analysis of ZIF-67; and FIG. 5C illustrates $N_2$ adsorption desorption analysis of N—C—Co composite, according to some embodiments. Characteristic peaks of ZIF-67 disappear completely after heat treatment (FIG. 5A). Instead, three characteristic peaks of cobalt nanoparticles are seen at 44.2°, 51.6° and 75.9°, which correspond well with (111), (200), and (220) crystalline lattice planes of cobalt, respectively.

Nitrogen physical adsorption-desorption measurements were performed to analyze specific surface area and corresponding pore size distribution of ZIF-67 (FIG. 5B) and the N—C—Co composites (FIG. 5C). From these $N_2$ adsorption curves, a BET surface area is calculated to be 1392.3 $m^2/g$ for ZIF-67 and 232.5 $m^2/g$ for the N—C—Co composite. Moreover, the primary pore diameter is calculated to be 1.96 nm for ZIF-67, while for the N—C—Co composite, the pore size distribution shows two peaks at 4.81 nm and 6.36 nm, indicating that a mesoporous structure was formed during the N-containing 2-methylimidazolate ligands carbonization and acid treatment. The large surface area and adequate mesoporous structure enables high absorption capacity, physically, of the intermediate $Li_2S_x$, which enables excellent contact between sulfur and the catholyte.

Figure 6A:
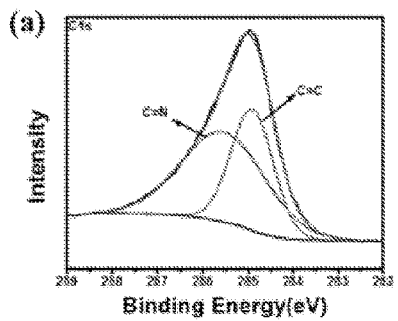
FIGS. 6A-6C illustrates high-resolution x-ray photoelectron spectroscopy (XPS) data of C1s (FIG. 6A); N1s (FIG. 6B); and Co 2p3/2 (FIG. 6C) of N—C—Co composite, according to some embodiments.
Figure 6B:
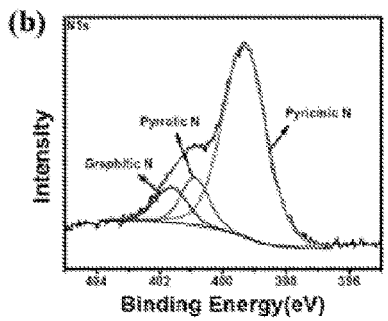
Figure 6C:
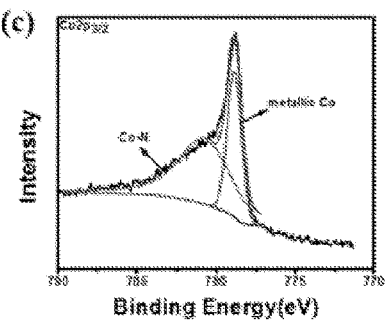

FIGS. 6A-6C illustrates high-resolution x-ray photoelectron spectroscopy (XPS) data of C1s (FIG. 6A); N1s (FIG. 6B); and Co 2p3/2 (FIG. 6C) of N—C—Co composite, according to some embodiments. The C1s spectrum (FIG. 6A) shows a main peak at around 284.9 eV, which may be assigned to C=N bonds (285.8 eV) and C=C bonds (284.8 eV), respectively. It has been shown that N-doped carbon surface may serve as a conductive Lewis base "catalyst," which can enhance the adsorption energy of $Li_2S_x$, thereby improving sulfur utilization. The nitrogen species in N—C—Co composite was further confirmed by N1s XPS spectrum (FIG. 6B). As is shown, three characteristic peaks are presented: pyridinic N (398.9 eV), pyrrolic N (400.4 eV), and graphitic N (401.3 eV). The superiority of the pyridinic N and pyrrolic N partly reflects the presence of Co—$N_x$. The pyridinic N, which is the main nitrogen species in the N—C—Co composite, is p-type doping and holds two p-electrons on the N atom, which would behave as a conductive Lewis base matrix for improving electrochemical performance. The high-resolution XPS spectrum of Co2p3/2 (FIG. 6C) may be resolved into two characteristic peaks centered at 778.5 eV and 780.3 eV, which confirm the existence of metallic cobalt and indicates that cobalt nanoparticles are embedded into the network consisting of nitrogen species Co—N, respectively.

Figure 7A:
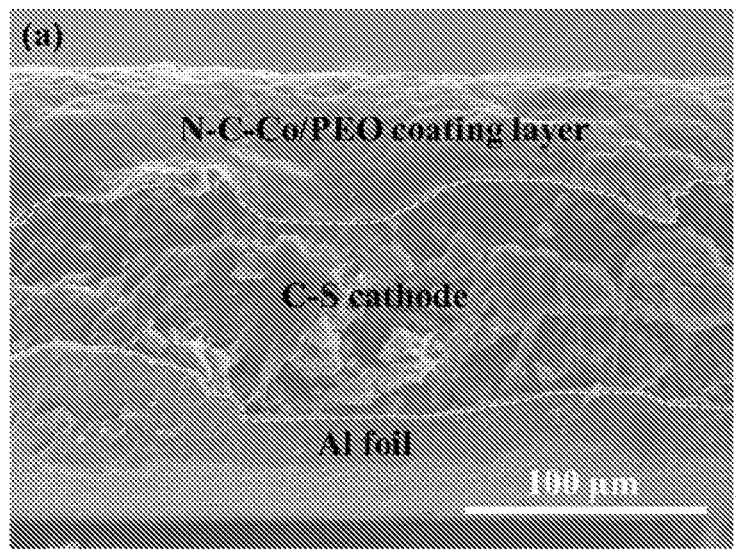
FIG. 7A illustrates a cross-sectional SEM image of a modified C—S cathode with a N—C—Co/PEO coating layer.
Figure 7B:
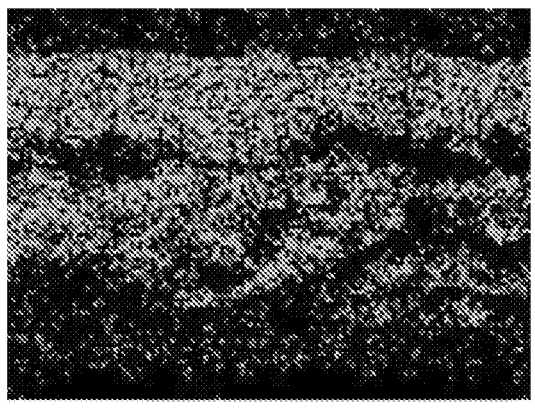
FIGS. 7B-7G illustrate elemental mapping of carbon, sulfur, fluorine, cobalt, oxygen, and aluminum, respectively, of the modified C—S cathode, according to some embodiments.
Figure 7C:
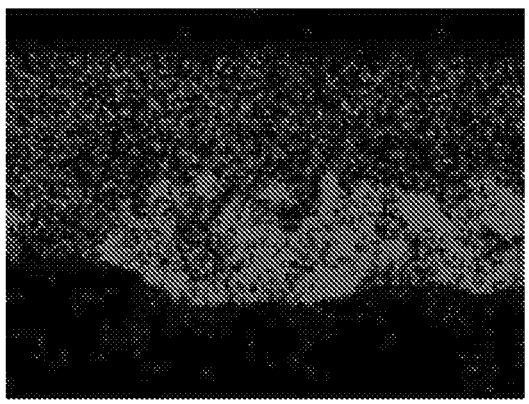
Figure 7D:
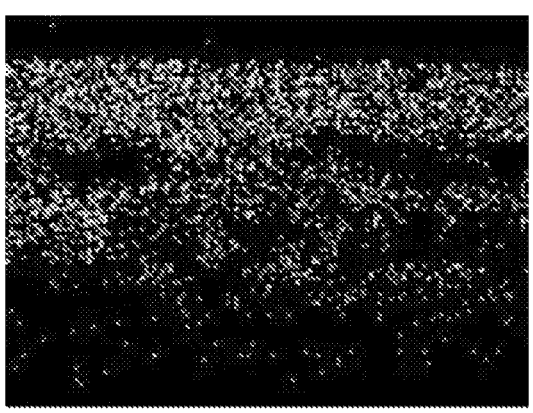
Figure 7E:
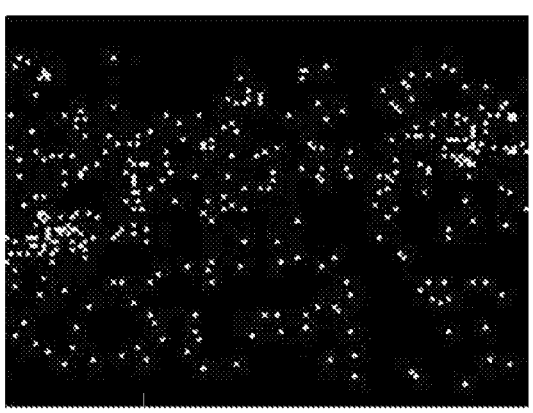
Figure 7F:
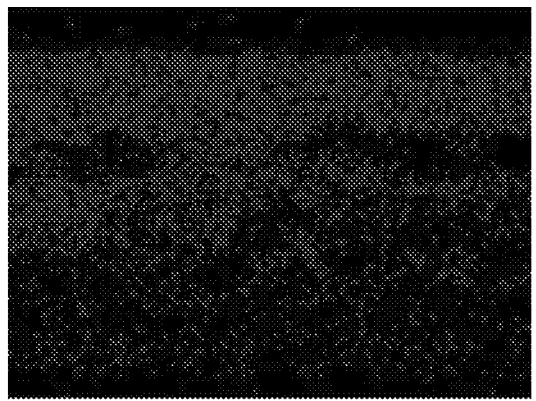
Figure 7G:
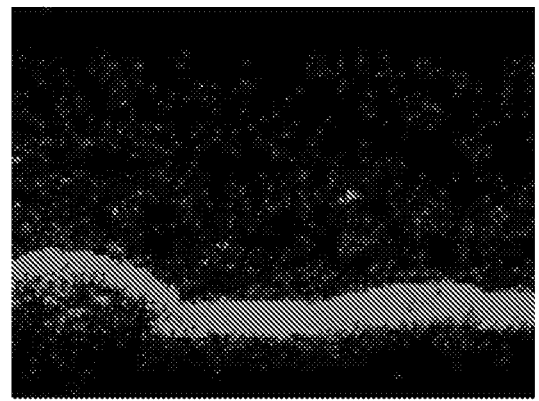

FIG. 7A illustrates a cross-sectional SEM image of a modified C—S cathode with a N—C—Co/PEO coating layer disposed thereon and filtering in the C—S cathode; FIGS. 7B-7G illustrate elemental mapping of carbon, sulfur, fluorine, cobalt, oxygen, and aluminum, respectively, of the modified C—S cathode, according to some embodiments. As shown in FIG. 7A, the thickness of the modified C—S cathode is about 150 nm, and the N—C—Co/PEO coating layer is about 30 nm. Particularly, the Co EDS mapping in FIG. 7E clearly indicates that the N—C—Co/PEO coating layer penetrates evenly into the C—S cathode layer (indicated by the EDS of carbon in FIG. 7B and the EDS of sulfur in FIG. 7C) due to the uniform distribution of Co markers to the Al foil substrate (see FIG. 7G). In some examples, the N—C—Co/PEO coating layer penetrates to and may directly contact the substrate.

FIGS. 8A and 8B illustrate impedance plots of Li—S batteries before cycling with Example 8 and Comparative Example 1 (FIG. 8A) and Comparative Example 2 (FIG. 8B). The Example 8 cell shows the lowest impedance of 203 $\Omega \cdot cm^2$ versus 249 $\Omega \cdot cm^2$ for the Comparative Example 1 cell, which excludes the N—C—Co composite in the partially infiltrated PEO layer (FIG. 8A). This indicates a function of the N—C—Co/PEO layer. The PEO polymer (containing LIFSI) is a good Li-ion conductor. By infiltrating into the cathode, the N—C—Co/PEO is able to construct a well-connected network that penetrates deep into the active C—S cathode material, and functions as a quick ionic conducting pathway, thereby decreasing cell impedance. Addition of the N—C—Co composite may further help lithium diffusion and further reduce cell impedance. The Comparative Example 2 cell shows much higher impedance, exceeding 10000 $\Omega \cdot cm^2$. Cells with this large of impedance cannot adequately perform charge-discharge cycling. The PEO interlayers at both cathode and anode sides of the solid electrolyte improve the connections of the cathode/anode with the solid electrolyte and as a result, significantly reduces interfacial impedance.

FIGS. 9A and 9B illustrate cycling performance of solid-state Li—S batteries with Example 8 (FIG. 9A) and Comparative Example 1 (FIG. 9B) at 60° C. with 0.1 $mA/cm^2$ current density. The Li—S battery in Example 8 delivers a reversible capacity of about 920 mA/hgs[1] at the first cycle and a 50% capacity retention after 50 cycles. In comparison, the Comparative Example 1 battery has a 24% capacity retention after 50 cycles. The improved capacity retention in the Example 8 cell is due to the function of N—C—Co composite. As demonstrated above, N—C—Co composites are able to capture polysulfides and, because it is a good electronic conductor, N—C—Co composites can also improve reuse of the polysulfide. Reduction of polysulfides from the electron and ion conductive matrix is the major cause of the capacity reduction.

Thus, as presented herein, this disclosure relates to solid-state lithium sulfur batteries, and more particularly, to carbon-sulfur cathodes (and their method of production) coated with ionic conductive PEO/N—C—Co layers for solid state Li—S batteries with ceramic electrolytes. Advantages include (1) penetration of N—C—Co/PEO into the C—S electrode enables excellent contact between the active material and ionic conductive network, and an increase in the utilization ratio of active materials; (2) N—C—Co/PEO coating layer can absorb and reuse polysulfides during cycling, thereby mitigating the polysulfides shuttle effect; (3) the PEO-based coating layer and interlayer help to improve interface stress and reduce interface resistance of solid-state Li—S battery; and (4) the solid-state Li—S battery with the C—S cathode disclosed herein has high specific capacity and stable cycling performance, as compared with Li—S batteries with conventional cathodes.

Minimizing stress/strain and constructing a robust electronic and ionic pathway between the carbon-sulfur cathode and solid-state electrolyte is key challenge for enhancing reaction kinetics of lithium sulfur batteries. Poor contact between electronic conductor, active materials and lithium ionic conductor hinder the practical application. As presented herein, penetration of the coating layer into the cathode provides a conductive network within the cathode and provide excellent contact among materials with the battery stack.

Therefore, the Li—S battery made from the cathode formed from the methods presented herein has a higher reversible specific capacity (e.g., greater than 920 mA/hgs$^1$), lower overall impedance, and more stable cycling performance, as compared with conventional Li—S batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A lithium-sulfur battery, comprising:
   a substrate;
   a sulfur cathode disposed on the substrate, the sulfur cathode having pores formed in a carbon-sulfur material;
   a coating layer disposed on the sulfur cathode;
   a first interlayer disposed on the coating layer;
   a solid-state electrolyte disposed on the first interlayer;
   a second interlayer disposed on the electrolyte; and
   a lithium anode disposed on the second interlayer,
   wherein the coating layer is homogenously disposed within the pores of the sulfur cathode, and the coating layer comprises polyethylene oxide, at least one lithium salt, and an N—C—Co composite.

2. The battery of claim 1, wherein the coating layer comprises at least one of: carbon polysulfides (CS), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof.

3. The battery of claim 2, wherein the at least one lithium salt is selected from the group consisting of: bis(trifluoromethane) sulfonimide lithium salt (LiN(CF$_3$SO$_2$)$_2$) (LiTFSI), lithium perchlorate, lithium bis(oxalato) borate (LiBOB), lithium bis(fluorosulfonyl)imide (LiFSI), lithium trifluoromethanesulfonate (LiCF$_3$SO$_3$) (LiTf), lithium bis (trifluoromethanesulfonimide) (Li(C$_2$F$_5$SO$_2$)$_2$N) (LiBETI), or combinations thereof.

4. The battery of claim 1, wherein the N—C—Co composite comprises a rhombic dodecahedral morphology and at least one dimension in a range of from 10 nm to 50 nm.

5. The battery of claim 1, wherein the N—C—Co composite comprises a mesoporous structure and a BET surface area in a range of from 100 m$^2$/g to 300 m$^2$/g.

6. The battery of claim 1, wherein the sulfur cathode and the coating layer have a combined thickness of less than 200 μm.

7. The battery of claim 1, wherein the solid-state electrolyte comprises at least one of: Li$_{6.4}$La$_3$Zr$_{1.4}$Ta$_{0.6}$O$_{12}$ (LLZTO), Li$_{10}$GeP$_2$S$_{12}$, Li$_{1.5}$Al$_{0.5}$Ge$_{1.5}$ (PO$_4$)$_3$, Li$_{1.4}$Al$_{0.4}$Ti$_{1.6}$ (PO$_4$)$_3$, Li$_{0.55}$La$_{0.35}$TiO$_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed Li$_3$PS$_4$, or combinations thereof.

8. The battery of claim 1, wherein the sulfur cathode has a porosity of at least 30%.

9. The battery of claim 1, wherein the sulfur cathode has a porosity of at least 60%.

10. The battery of claim 1, wherein the pores of the sulfur cathode have a size in a range of from 1 μm to 50 μm.

11. The battery of claim 1, configured to exhibit at least one of:
   an impedance below 250 Ω·cm$^2$;
   a reversible capacity of at least 500 mA/hgs$^1$; or
   a capacity retention of at least 40%.

12. A lithium-sulfur battery, comprising:
   a sulfur cathode disposed on a substrate, the sulfur cathode having pores formed in a carbon-sulfur material; and a coating layer disposed on the cathode, and the coating layer is homogenously disposed within the pores of the cathode, wherein the coating layer is a polyethylene oxide (PEO)-based lithium ion conductive layer with N—C—Co composite, further disposed within pores of the sulfur cathode.

13. The battery of claim 12, wherein the coating layer comprises at least one lithium salt selected from the group consisting of: bis(trifluoromethane) sulfonimide lithium salt ($LiN(CF_3SO_2)_2$) (LiTFSI), lithium perchlorate, lithium bis (oxalato) borate (LiBOB), lithium bis(fluorosulfonyl)imide (LiFSI), lithium trifluoromethanesulfonate ($LiCF_3SO_3$) (LiTf), lithium bis(trifluoromethanesulfonimide) (Li$(C_2F_5SO_2)_2$N) (LiBETI), or combinations thereof.

14. The battery of claim 12, wherein the N—C—Co composite comprises a rhombic dodecahedral morphology and at least one dimension in a range of from 10 nm to 50 nm.

15. The battery of claim 12, wherein the N—C—Co composite comprises a mesoporous structure and a BET surface area in a range of from 100 $m^2$/g to 300 $m^2$/g.

16. The battery of claim 12, wherein the sulfur cathode and the coating layer have a combined thickness of less than 200 μm.

17. The battery of claim 12, configured to exhibit at least one of:
- an impedance below 250 Ω·$cm^2$;
- a reversible capacity of at least 500 mA/hgs$^1$; or
- a capacity retention of at least 40%.

* * * * *